United States Patent [19]
Foster

[11] 3,763,588
[45] Oct. 9, 1973

[54] FISHING LURE

[76] Inventor: Robert D. Foster, 991 Sharp Ave., N.W., Camden, Ark.

[22] Filed: Sept. 9, 1971

[21] Appl. No.: 179,027

[52] U.S. Cl. .................... 43/4, 43/42.33, 73/343 R
[51] Int. Cl. ............................................. A01k 85/00
[58] Field of Search .................... 43/42.33, 42, 4, 43/1; 73/343 R, 343 B, 353, 374, 292

[56] References Cited
UNITED STATES PATENTS

| | | | |
|---|---|---|---|
| 1,772,058 | 8/1930 | Welch | 43/42.33 |
| 2,906,124 | 9/1959 | Chaney | 73/374 |
| 2,319,101 | 5/1943 | Anderson | 73/343 B |

FOREIGN PATENTS OR APPLICATIONS

| | | | |
|---|---|---|---|
| 1,115,959 | 1/1956 | France | 73/343 R |

Primary Examiner—Russell R. Kinsey
Assistant Examiner—Daniel J. Leach
Attorney—Dunlap et al.

[57] ABSTRACT

A fishing lure having a body portion constructed predominantly of a transparent synthetic resin material, and having embedded in the material, a capillary thermometer. A bulb portion of the thermometer is disposed adjacent a relatively thin terminal portion of the lure and the longitudinal axis of the thermometer extends along a portion of the length of the lure. The transparent plastic body of the lure has a coating material disposed over a substantial portion of the body, and arranged and configured to impart a natural bait appearance to the lure. Hook hanger eyes are attached to the synthetic resin body, and the body may be provided with a diving plane thereon.

4 Claims, 6 Drawing Figures

PATENTED OCT 9 1973

3,763,588

INVENTOR
ROBERT D. FOSTER

BY
Dunlap, James, Hussin & Dougherty
ATTORNEYS

FISHING LURE

BACKGROUND OF THE INVENTION

1. Field of the Invention

This invention relates to artificial fishing lures, and more particularly, to an artificial fishing lure having a temperature registering device disposed thereon and easily visually perceptible as the fishing lure is observed.

2. Brief Description of the Prior Art

The importance of water temperature to the knowledgeable location of game fish by the angler is discussed in U. S. Pat. No. 3,031,788. M. L. Shannon, in this patent, proposes to attach in the fisherman's line near the bait in use, a temperature sensing device which is connected by electrical leads to a suitable temperature read-out device mounted in the fisherman's reel or otherwise in close proximity to the fisherman.

The value to the fisherman of knowing the water temperature at various depths was also recognized by C. G. Harris and is discussed in his U. S. Pat. No. 2,609,689. The patent is directed to a specially constructed underwater sampling thermometer suitable for providing this information to the fisherman.

BRIEF DESCRIPTION OF THE PRESENT INVENTION

The present invention comprises a fishing lure which effectively simulates the natural food of game fish, and is a useful and effective bait for the purpose of catching such fish. The lure concurrently functions to apprise the fisherman of the temperature of the water through which the lure is moved by the inclusion in the lure body of a capillary type thermometer which is mounted for response to water in contact with the lure.

Broadly described, the lure of the invention includes a body portion constructed of a transparent synthetic resin material and geometrically configured to simulate generally, but not slavishly, a naturally occurring food fish constituting forage for various types of game fish. Embedded in or carried by the body is a capillary type thermometer which includes a bulb and capillary tube. The bulb portion of the thermometer is positioned in the lure at a location to permit rapid response to the temperature of water in contact with the lure. In a preferred embodiment of the lure, the capillary tube thereof extends along a longitudinal axis of the lure.

Over a major portion of the body of the lure, a coating material is adhered to the body of the lure for the purpose of imparting a desired appearance to the lure. The appearance sought may be a scale type finish, or any other type of design which will enhance the natural appearance of the lure. The body is provided with at least one hook hanger for suspending a hook therefrom, and an eyelet for attaching a fishing line thereto.

An important object of the invention is to provide an artificial fishing lure which is effective in attracting and catching game fish, and which, during the use thereof, functions concurrently to register the temperature of the water through which it moves so that the fisherman may be apprised of the temperature conditions in the zone where the lure is cast and through which it is moved.

A further object of the invention is to provide an economically manufactured fishing lure having as an integral part thereof, a temperature registering device which does not, in any way, interfere with the effectiveness of the lure in attracting and catching fish.

A more specific object of the invention is to provide a fishing lure which has incorporated therein, a capillary type thermometer with the thermometer arranged in the body of the lure so as to enhance the simulation of a naturally occurring food species of game fish.

Additional objects and advantages of the invention will become apparent as the following detailed description of preferred embodiments of the invention is read in conjunction with the accompanying drawings.

DETAILED DESCRIPTION OF A PREFERRED EMBODIMENT OF THE INVENTION

Figure 1:
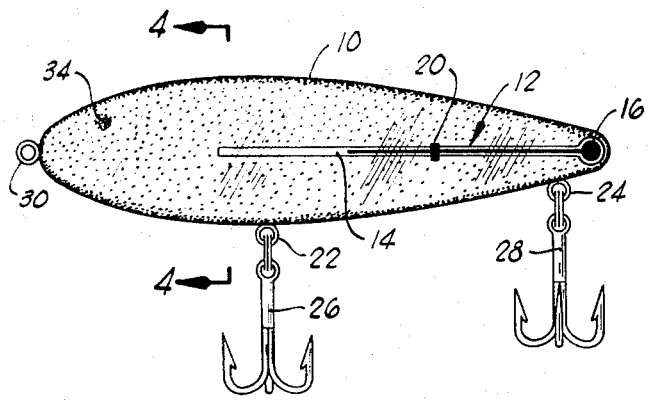
FIG. 1 is a side elevation view of one embodiment of the fishing lure of the present invention.
Figure 3:
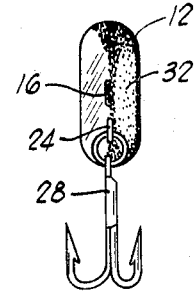
FIG. 3 is a view in elevation of the fishing lure depicted in FIG. 1 as the lure appears when observed from the rear end thereof.

Referring initially to FIG. 1 of the drawings, shown therein is a fishing lure which has been constructed in accordance with the present invention. The fishing lure includes a body 10 which is constructed of a transparent synthetic resin. The lure body 10 is preferably constructed by molding, and is configured to simulate a minnow or small shad fish of the type which constitutes a favorite food of bass and other game fish. Though the body 10, in the illustrated embodiments of the invention, is shown constructed as a solid body of synthetic resin, it will be understood by those skilled in the art that the body may be molded so as to contain a void or air space to impart a desired degree of buoyancy to the lure. Techniques for accomplishing such construction are well known in the art.

Figure 2:
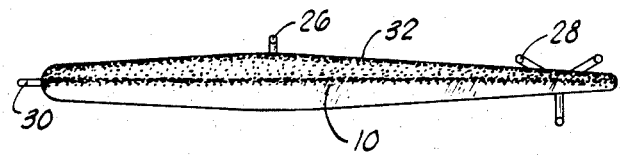
FIG. 2 is a top plan view of the fishing lure depicted in FIG. 1.
Figure 4:
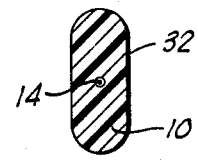
FIG. 4 is a sectional view taken along line 4—4 of FIG. 1.

In the manufacture of the lure body 10, there is embedded in the body during the molding process, a capillary-type thermometer designated generally by reference numeral 12. The capillary-type thermometer 12 includes an elongated capillary tube 14 which is positioned centrally in the lure body 10 and extends coaxially therealong. The thermometer 12 further includes a bulb 16 which, in the illustrated embodiment, is positioned in close proximity to the tail portion of the body 10, but which is surrounded and protected by a thin layer of the synthetic resin. As will be perceived in referring to FIGS. 1 and 2 of the drawings, the tail portion of the body 10 is relatively thin so that the insulating effect of the synthetic resin which surrounds the bulb 16 of the thermometer 12 is minimized. The thermometer 12 contains alcohol, mercury or other suitable temperature responsive fluid which undergoes expansion and contraction upon being exposed to variations in temperature. In the illustrated embodiment of the invention, there is positioned around the capillary tube 14 at a selected point intermediate its length, a small band 20 which may be constructed of an elastomeric material such as rubber or the like.

Along the lower side of the body 10, a pair of hook hangers 22 and 24 are provided and may be affixed to the body by any suitable means such as by screwing, or by molding in the body in the course of the modling process. The hook hangers function to suspend a pair of treble hooks 26 and 28 from the body of the lure. At the forward end of the body 10, an eyelet 30 is screwed or molded into the body, and functions as a point of attachment of the body to a fishing line.

The body 10 is provided along one side thereof and across the top and bottom with paint 32 or other suitable coating material to impart to the body a coloration similar to that characteristic of the natural bait being emulated. Thus, a scale type finish may be provided, or other finishes used which will yield the aesthetic effect desired. Adjacent the nose or forward portion of the body 10, a simulated eye 34 is painted. It will be noted in referring to FIG. 2, that the paint has not been extended over the second side of the body 10 but, from FIG. 1, it may also be perceived that the visual effect of the paint is transmitted through the transparent body so that the paint is apparent and visible from the opposite side of the body from that to which it is applied. This method of finishing the exterior of the body 10 permits the thermometer 12 to be easily seen through the transparent synthetic resin, and allows the position of the expansible liquid therein to provide a visual indication of the temperature of water through which the lure has been moved. It will be apparent that, should it be desired, the paint or finish of the lure may be extended over a greater portion of the body 10, so long as the thermometer 12 is not obscured thereby. In some instances where economy of manufacture is not a critical consideration, more extensive painting will be carried out.

The embodiment of the invention illustrated in FIGS. 1-4 incorporates a simple temperature indicating system which, by the use of the band 20, simply apprises the fisherman of where the temperature of the water through which the lure has moved stands in relation to optimum temperature for fishing for certain types of fish. Thus, for example, the band 20 may be located at a place on the capillary tube 14 corresponding to the terminal point of the liquid therein when the temperature through which the lure has moved is equivalent to about 40°F. This temperature is generally recognized to be about the optimum temperature for fishing for bass. When the expansible liquid extends beyond the band 20 in the capillary tube 14 as portrayed in FIG. 1, the indication then is that the water through which the lure has moved is too warm for optimum fish occupation, and that a different water level, usually deeper, should be fished. Conversely, if the expansible liquid in the tube 14 does not extend to the band 20 from the bulb 16, the indication then is that the water being fished is too cool for optimum fishing.

Figure 5:
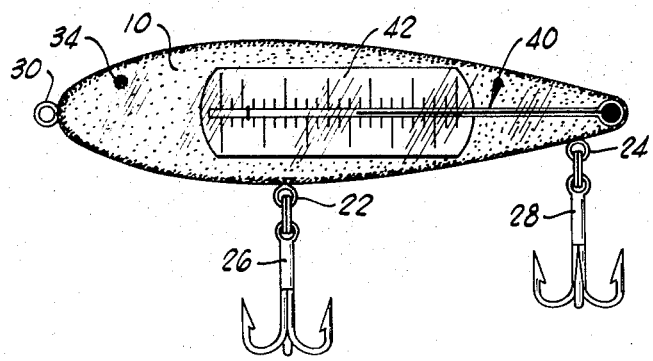
FIG. 5 is a side elevation view of a modified embodiment of the present invention.

Another embodiment of the invention is depicted in FIG. 5 of the drawings. In this embodiment of the invention, the thermometer utilized is designated generally by reference numeral 40 and differs from the thermometer depicted in FIG. 1 in having, in association with the capillary tube 14, a graduated thermometer scale plate 42. This plate is very thin, and is also embedded in the synthetic resin body 10 of the lure. The scale plate 42 provides an indication of the actual temperature of the water through which the lure is moved, as contrasted with simply indicating the temperature of the water in relation to optimum temperature as does the thermometer 12 as depicted in FIG. 1.

Figure 6:
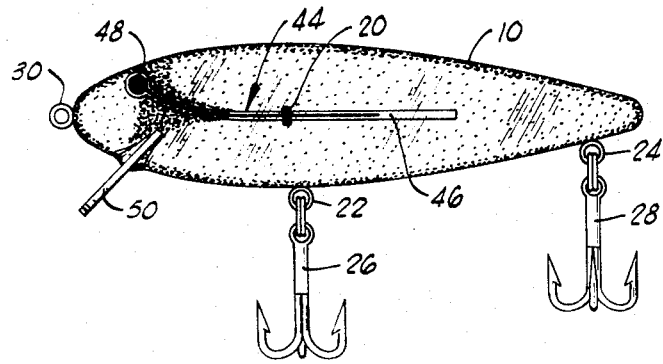
FIG. 6 is a side elevation view similar to FIGS. 1 and 5, but showing yet another embodiment of the invention.

In the embodiment of the invention shown in FIG. 6 of the drawings, the thermometer 44 is utilized which includes a bent capillary tube 46 which has the main portion thereof extending coincidentally with the longitudinal axis of the lure body 10. A short length of the capillary tube 46 adjacent the thermometer bulb 48 projects upwardly and forwardly in the lure from the elongated portion thereof which extends coincidentally with the longitudinal aixs of the body. The bulb 48 may thus be located in a position adjacent the top edge of the lure, and near the nose or forward end thereof, so as to simulate the eyes of the bait fish which the lure represents.

In further carrying out the scheme of live bait emulation, the expansible liquid carried in the capillary type thermometer may be colored so that the bulb 48 has the natural color of the eye of a shad or minnow or other type of natural bait. It will be seen in referring to FIG. 6 that this embodiment of the invention further differs from that shown in the other figures of the drawing in that a portion of the paint, pigment or other coating which is used to coat a major portion of the body 10 of the lure has been placed on the body at a location adjacent the bulb 48 so as to obstruct from view that portion of the capillary tube 46 which is angled forwardly and upwardly in the lure body. This prevents this portion of the tube from detracting from the natural appearance of the "eyes."

As a final feature of the lure depicted in FIG. 6, a diving plane 50 is secured to the lower side of the lure adjacent the nose or forward end thereof, and projects downwardly and forwardly at an angle appropriate to give the desired planing effect to cause the lure to dive or seek a greater depth in the water. Various shapes of diving planes may be utilized, and their construction and method of incorporation in the lure body 10 are well understood in the art.

Although it is believed that the method of operation of the lure and its utility will be well understood by those skilled in the art of fishing, and the importance of temperature in the attempt to catch various types of fish will be well understood by such persons, it may be briefly pointed out for the benefit of the reader that, in use, the fishing line is tied to the eyelet 30 located at the forward end of the body 10, and the lure is then cast at a selected location on the surface of the water. The lure is then retrieved with any one of a variety of types of motions, and the lure can be made, according to its construction, to move through the water at various selected depths. Thus, with proper buoyancy characterizing the body 10 of the lure shown in FIG. 6 of the drawings, a floater-diver type lure may be made. In other instances, the lure may be made to be a deep runner type, or may be made to constitute a surface lure.

In any event, as the lure moves through the water, the temperature of the water, on any run of significant distance by the lure, will cause the thermometer embedded in the body of the lure to respond, and the liquid in the thermometer will expand or contract to a position indicative of the water temperature. On completing the retrieve of the lure, the fisherman may then observe the thermometer to ascertain the temperature of the water through which the lure is moved. He may then wish to adjust the weighting of the lure, or use a different type of lure to fish at a different depth to obtain a more optimum temperature condition. It may be further commented that by optimum location of the thermometer and proper selection of the coloration of the liquid used therein, the thermometer tube may be made to appear as an elongated major vein extending lengthwise in the body of the simulated fish — a physiological characteristic which is outwardly perceptible in some types of natural bait. Also, of course, the bulb, per se, of the thermometer may be made to simulate the eyes of the bait emulated.

From the foregoing description of the invention, it will be apparent that the artificial bait of the invention provides a handy and useful tool for sport fishermen which enables them to fish more effectively, taking into consideration in doing so, the temperature of the water through which their lure is moved.

Although certain preferred embodiments of the invention have been herein described in order to illustrate the basic principles of the invention, it will be understood that various changes and modifications from these embodiments can be effected without departure from the underlying principles. Changes and innovations of this type are therefore deemed to be circumscribed by the spirit and scope of the invention, except as the same may be necessarily limited by the appended claims or reasonable equivalents thereof.

What is claimed is:

1. A fishing lure comprising:

a temperature registering thermometer including a bulb portion and an elongated capillary tube portion;

a lure body completely enclosing and surrounding said temperature registering thermometer, said lure body being shaped to resemble a natural minnow and tapering to a relatively thin dimension adjacent one end thereof, said thermometer having said bulb portion positioned adjacent said one end of said lure body for temperature response to water through which said lure moves;

indicator means within said lure body and adjacent said capillary tube for indicating a specific preselected temperature registered by said thermometer;

indicia on said body imparting a natural fish appearance to said body without obscuring visibility of said thermometer from outside said body;

hook hangers secured to one side of said lure body; and an eye for attachment of a fishing line secured to one end of said lure body.

2. A fishing lure as define in claim 1 wherein said lure body has a nose portion, a tail portion, an upper edge and a lower edge; and said thermometer includes a bulb portion and an elongated capillary tube, said bulb portion being positioned in the nose portion of said body adjacent the upper edge thereof and forming a simulated fish eye in said body.

3. A fishing lure as defined in claim 2 wherein said capillary tube extends along a longitudinal central axis of said body, which axis extends between the forwardmost portion of the lure and the rearmost portion of the body.

4. A fishing lure as defined in claim 1 wherein said lure body is a transparent molded synthetic resin body and said indicia is paint applied over at least one side of said lure body.

* * * * *